Figure 1:
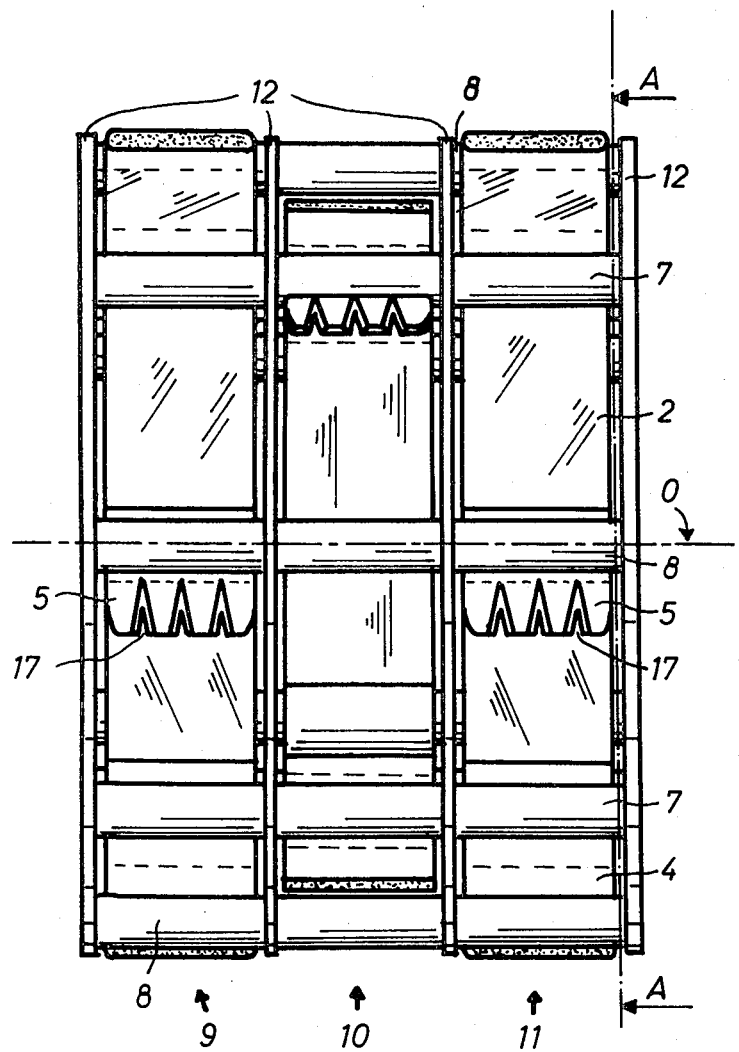

United States Patent [19]

Boas et al.

[11] 4,376,325
[45] Mar. 15, 1983

[54] SURFACE CLEANING DEVICE FOR CARCASSES

[75] Inventors: Peter F. Boas, Roskilde; Olfert H. Petersen, Lejre, both of Denmark

[73] Assignee: Slagteriernes Forskningsinstitut, Roskilde, Denmark

[21] Appl. No.: 194,395

[22] PCT Filed: Oct. 18, 1979

[86] PCT No.: PCT/DK79/00038

§ 371 Date: Jun. 20, 1980

§ 102(e) Date: Jun. 19, 1980

[87] PCT Pub. No.: WO80/00779

PCT Pub. Date: May 1, 1980

[30] Foreign Application Priority Data

Oct. 20, 1978 [DK] Denmark .............................. 4676/78

[51] Int. Cl.³ .............................................. A22B 5/08
[52] U.S. Cl. ............................................................ 17/18
[58] Field of Search ................................ 17/18, 67, 47

[56] References Cited

U.S. PATENT DOCUMENTS

| | | | |
|---|---|---|---|
| 695,231 | 3/1902 | Preston et al. ......................... | 17/18 |
| 990,754 | 4/1911 | Lebiedzinski ........................... | 17/11 |
| 1,001,640 | 8/1911 | Hannaford ............................. | 17/18 |
| 1,214,493 | 2/1917 | Allbright ................................ | 17/18 |
| 1,249,774 | 12/1917 | Kramer .................................. | 17/18 |
| 2,204,755 | 6/1940 | Gonsor ................................... | 17/18 |
| 2,614,286 | 10/1952 | Ittel ....................................... | 17/18 X |

FOREIGN PATENT DOCUMENTS 15303 11/1911 Denmark .
2047323 4/1971 Fed. Rep. of Germany .

*Primary Examiner*—Willie G. Abercrombie
*Attorney, Agent, or Firm*—Fleit, Jacobson & Cohn

[57] ABSTRACT

A rotatable surface cleaning device is employed for removing undesirable offals from the muscles of carcasses and/or hair and bristles from the rind thereof. The device has scraper means along its periphery, and the outer ends of the scraper means are moved towards, along and away from the flesh surface or rind by rotation of the device. A gentle and effective cleaning is achieved when the scraper means are constructed as rigid scraper fingers (5) which at the opposite end of the scraper end (3) are pivotally secured in the device with pivot axes (6) parallel with the axis of rotation (0) of the device. The freely pivotable fingers are spaced circumferentially and axially in the device.

6 Claims, 2 Drawing Figures

SURFACE CLEANING DEVICE FOR CARCASSES

The invention relates to a surface cleaning device for removing undesirable offals, such as glands, loose membranes, veins, blood vessels and blood from the muscles as well as hair and bristles from the rind, in particular in hogs.

The problem of these operations resides in the wish for a removal as complete as possible of said offals without simultaneously damaging the muscles and the rind, respectively, and that this can be done at unprohibitive costs.

In the slaughtering line it is known to use so-called gland tongs to remove glands and veins in particular from the internal neck area in hanging hog carcasses, but this operation is time-consuming, manually strenous for the operative and fails to meet the wish for a complete removal and does not remove surface blood.

Moreover, it is known, for the same purpose to employ a machine-powered, narrow, cutter-like gear wheel, but it suffers from serious drawbacks because only to a very limited extent is this gear wheel able to remove glands and veins and, further, the neck area is rather wide, necessitating several, parallel, up and down movements to remove glands, etc., and since the muscles in the area in question do not lie in one plane or one cylindrical face, it will not help making the known cutter wheel wider because the cutter teeth will then protrude into and lacerate the protruding muscles when treating the deep-lying muscles. Moreover, even the rather narrow cutter wheel requires utmost care on the part of the operator because even a slight increase in the engagement pressure of the cutter wheel against the muscle will lacerate and thus destroy the muscle.

For dehairing carcasses it is known to rotate said carcasses resting horizontally on one or more horizontal support rollers provided with so-called beaters of an elastic material and optionally provided with nose irons. In these dehairing devices it is a considerable drawback involving large costs that the beaters are worn rather quickly and thus loose their dehairing effect and must eventually be replaced with consequent large costs in terms of materials, wages and lost production, and finally, the dehairing effect of said beaters is such that it is necessary to carry out one or more subsequent treatments in the form of burning and brushing to remove the remaining brushes and irregularities.

The objct of the present invention is to eliminate said problems of said operations. This is achieved according to the invention by a surface cleaning device of the type having several, individual scraper elements at engagement ends of fingers arranged to remove undesirable offals by movement along and towards and away from the flesh surface and/or rind.

Hereby it is achieved that the individual scraper fingers apply an engagement pressure, independent of the other scraper fingers, to the surface being processed so that also the deeper surfaces are cleaned without the protruding surfaces becoming destroyed. Another advantage is that for a given finger and wheel geometry the engagement pressure will increase with the square of the number of revolutions, while the scraper rate will increase substantially only linearly with the number of revolutions.

In one embodiment, the scraper fingers consist of plate-like material having engagement ends provided with slots tapering in a direction away from the end edge. Such finger provides a very satisfactory increase in the efficiency of the device. For removing veins and glands in the treatment of muscles, without any damage to the muscles, scraper fingers are used where the slots largely taper in the direction of rotation of the fingers, while fingers with an opposite taper, seen in cross section, have proved to be particularly expedient for removing bristles and hair from rinds.

The provision of a grinding surface at the engagement end of some or all of the scraper fingers has been found to be suitable for dehairing, in that a large portion of the remaining hair and surface irregularities caused by e.g. tetter are removed.

One embodiment of the invention uses rigid scraper fingers having inner ends pivotally secured to a rotatable wheel. The wheel has circular, peripheral, outer ring faces between which individual sets of scraper fingers may move. The provision of such wheel significantly reduces damage to the surfaces because the individual scraper fingers, when encountering resistance of a certain order, will become inactive by swinging down below the cylinder face.

The outer ring faces of the wheel may be provided with a friction producing surface, that is, a coating of a frictional material or a rough surface treatment. This feature of the invention makes it possible to rotate the carcass slightly when dehairing it so that gradually all faces will be scraped, but without this slight rotation having to be provided by the scraper fingers, which may thus be dimensioned exclusively for optimum dehairing and minimum damage to the rind.

The angle of swing of the individual scraper fingers in the direction of rotation of the wheel is limited so that the engagement end of the finger is prevented from passing through the radial plane through the pivot axis of the scraper finger. An advantage of such arrangement is that the engagement end of the scraper finger when encountering resistance will move toward the centre axis of the wheel, reducing damage to the surface.

It is possible to bend the outer end portions of the scraper fingers in the direction of rotation of the wheel. This permits the centre of gravity of the scraper fingers to be moved in a simple manner in relation to the line between the engagement end of the finger and its axis of swing, resulting in an increased engagement pressure for a given geometry. Moreover, an improved removal effect is achieved by the changed scraper angle and a particularly effective scraping is achieved by positioning the outermost end portion of the scraper finger so that it forms an angle of between 50° to 65° with a plane through the engagement end of the finger and the axis of the wheel.

The invention also provides an expedient embodiment of a cleaning device for removing undesirable offals from muscles.

The provision during rotation of a supply of water results in a particularly expedient removal of in particular surface blood. The supply of water during rotation provides a mechanical treatment sort of pumping out the blood from the cut veins and blood vessels, which cannot be achieved by water flushing alone.

The invention will be described in more detail below by means of an embodiment,

FIG. 1 being a side view of a device, and

Figure 2:
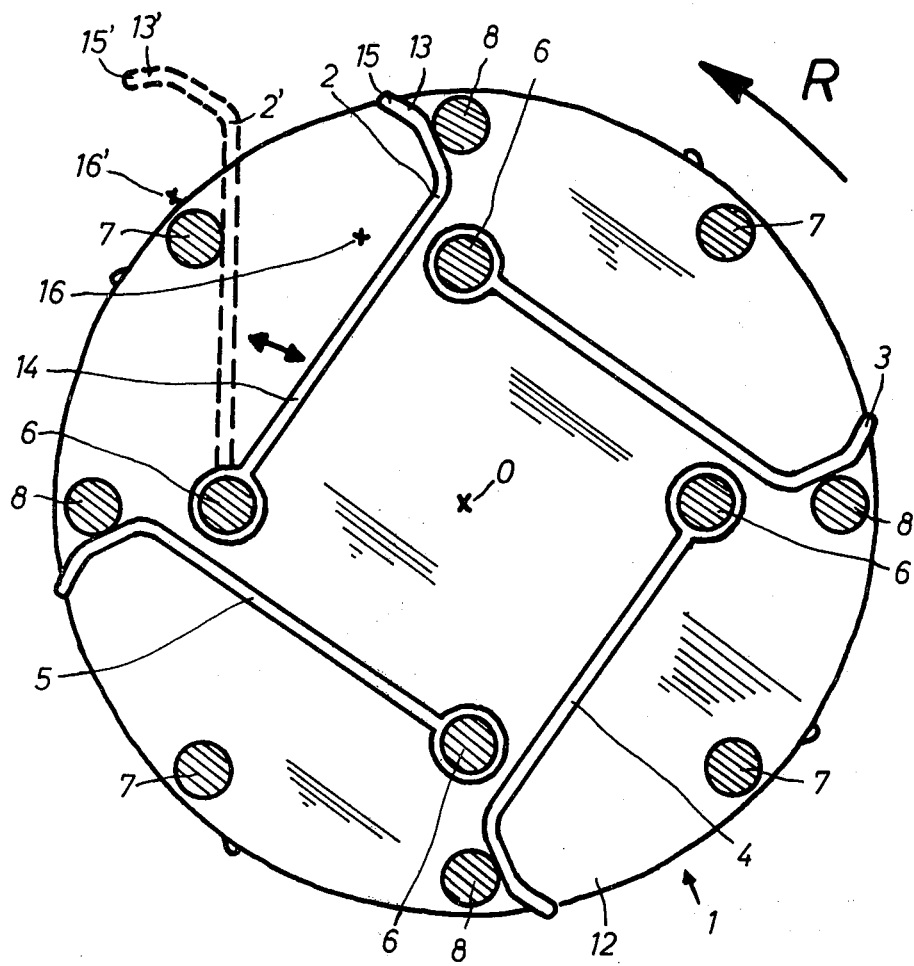

FIG. 2 being a section A—A of the device of FIG. 1.

FIG. 2 shows a device 1 with four scraper fingers 2, 3, 4 and 5 which are pivotally journalled in pivots 6. In the shown direction of rotation R the finger 2 may thus pivot to the position 2', where the finger 2 is arrested by the abutment of a connecting pin 7. The fingers 3, 4 and 5 may similarly pivot about their respective pivots 6 between connecting pins 7 and 8, which in the shown embodiment are spaced 45° with respect to the axis of rotation 0 of the device 1.

It appears from FIG. 1 that three sets of sections 9, 10 and 11, each comprising four scraper fingers, are mounted side by side and between peripheral, outer ring faces 12, here in the form of discs, connected by the connecting pins 7 and 8.

The outer end portions 13 of the finger 2 are bent twice in the direction of rotation R with respect to the inner portion 14 of the finger, imparting a suitable engagement angle to the end portion 13 with an engagement face 15 with respect to a surface to be treated.

When the rotating device 1 and a surface (not shown) to be treated are brought close to each other, the fingers will be in their extreme positions, exemplified by 2' for the finger 2. The engagement face 15' of the finger 2 will then scrape along said face over a certain section, and during the passage of said section e.g. the finger 2 will pivot back to its inner position, abutting on the connecting pin 8, simultaneously with the angle of engagement being only changed slightly. If the engagement face 15 encounters strong resistance it will also be urged back below the ring face 12 by a force applied to the centrifugal force on the centre of gravity 16 of the finger 2 multiplied by the arm to the axis of swing 6 of the finger 2, as well as the kinetic energy of the finger with respect to its pivot axis.

It appears from this that there are sample possibilities of adjusting the engagement pressure of the finger against a given surface, partly by changing the position of the pivot axis of the finger in relation to the axis of rotation 0 of the device, as well as the angle of swing of the finger by changing the position of the pins 7 and 8.

In FIG. 1 the fingers are in each section spaced 45° from the fingers in the adjoining section. Further, the outermost end portions 13 of the fingers are alternately provided with slots 17 (fingers 2 and 4) and grinding surfaces (fingers 3 and 5), said grinding surfaces being composed of an abrasive matrix consisting of a binder and abrasive grains having either rounded or sharp edges. The slots 17 whose opening tapers away from the edge and in the perpendicular direction thereto opposite the direction of rotation of the device, ensure a good removal of veins, vessels and loose membranes without the muscles becoming damaged. For dehairing purposes the slot should taper in the direction following the direction of the rotation of the device, ensuring a higher degree of removal of hair and bristles with roots rather than cutting at some distance from the rind surface.

Friction-coated engagement faces are primarily of interest for treatment of rind surfaces because both short bristles and so-called woolly hair are wedged, and the rind surface is slightly ground which imparts to it a considerably more pleasant appearance than heretofore possible because also small skin irregularities, such as slight tetter and the like are removed or at least smoothed out.

For treating rinds, the outer, peripheral ring faces are also provided with a friction material, such as rubber, which contributes towards rotating the hog or hogs being treated so that all hog surfaces will be engaged by the engagement ends of the fingers.

Usually, the device is used under simultaneous supply of water, whereby the veins, bristles, etc., which are torn off will be flushed away and do not block the slots or the grinding material. Finally, the effect of "massage" of the flesh surface with its torn off veins comprising blood, combined with washing provides a heretofore unknown degree of pure and undamaged muscle surfaces.

When using the device of the invention on flesh surfaces it is thus possible to save a subsequent surface trimming after cutting, which otherwise usually results in large amounts of valuable flesh being cut away.

When the device is used as a dehairing device the better surface quality provides innumerable possibilities of avoiding or reducing subsequent, heretofore necessary treatments of the rind, such as burning and brushing.

We claim:

1. A surface cleaning device for removing undesirable offals, in particular glands, loose membranes, veins, blood vessels and blood, from the muscles of carcasses and/or hair and bristles from the rind thereof, said device comprising a wheel rotating about an axis during operation and having a plurality of peripherally and axially spaced rigid cleaning fingers, each finger having a free engagement end provided with cleaning means, such as scraper and grinding means, for removing undesirable offals, each of said cleaning fingers being mounted on the wheel to be freely pivotable about a pivot axis which is parallel with the axis of rotation of the wheel and is spaced from said axis; and stop means for limiting the pivoting movement of each cleaning finger under the action of centrifugal force, said stop means being so disposed that an outermost active position of the cleaning finger is placed a substantial pivot distance from the pivoted position the cleaning finger would assume in case of unlimited pivot under the action of centrifugal force.

2. A device according to claim 1, further comprising means for limiting the angle of swing from said outermost position of the cleaning finger to approximately 45°.

3. A device according to claim 1 or 2, whereby the cleaning fingers consist of a plate-like material and are at their engagement ends provided with slots tapering in a direction away from an edge of the end, and seen in cross section in a direction normal to the plate material, the outer portion of the cleaning fingers being bent to point in the direction of rotation of the wheel.

4. A device according to claim 3, whereby the outer portions of the cleaning fingers in the active positions form an angle of between 55° and 65° with a plane through the engagement end of the finger and the axis of the wheel.

5. A device according to claim 1, whereby the distance between the pivot axis and the engagement end of a finger is between 0.6 and 1.6 times the radius of the wheel, and the distance of the pivot axis of the finger from the axis of rotation of the wheel is between 0.2 and 0.8 times the radius of the wheel.

6. A surface cleaning device for removing undesirable offals, in particular glands, loose membranes, veins, blood vessels and blood, from the muscles of carcasses and/or hair and bristles from the rind thereof, said device comprising a wheel rotating about an axis during operation and having a plurality of peripherally and axially spaced rigid cleaning fingers, the outer end portions of said cleaning fingers being bent in the direction of rotation with respect to an inner portion of the finger, imparting a suitable engagement angle to an end portion of the finger with an engagement face with respect to the surface to be treated, each finger having a free engagement end provided with cleaning means, such as scraper and grinding means, for removing undesirable offals, each of said cleaning fingers being mounted on the wheel to be freely pivotable about a pivot axis which is parallel with the axis of rotation of the wheel and is spaced from said axis such that when the cleaning finger encounters resistance in its passage over said carcass, the cleaning finger will pivot away from said carcass preventing damage to the carcass; and stop means for limiting the pivoting movement of each cleaning finger under the action of centrifugal force, said stop means being so disposed that an outermost active position of the cleaning finger is placed a substantial pivot distance from the pivoted position the cleaning finger would assume in case of unlimited pivot under the action of centrifugal force.

* * * * *